July 14, 1964 P. L. DE LUCA 3,140,672
MOLDED PALLET
Filed July 30, 1962 2 Sheets-Sheet 1

INVENTOR:
PETER L. DeLUCA
BY
ATT'YS

July 14, 1964 P. L. DE LUCA 3,140,672
MOLDED PALLET

Filed July 30, 1962 2 Sheets-Sheet 2

INVENTOR:
PETER L. DeLUCA
BY
ATT'YS

_United States Patent Office_

3,140,672
Patented July 14, 1964

3,140,672
MOLDED PALLET
Peter L. De Luca, Elgin, Ill., assignor to Hawley Products Company, St. Charles, Ill., a corporation of Delaware
Filed July 30, 1962, Ser. No. 213,392
8 Claims. (Cl. 108—53)

This invention relates to pallets; specifically to a one-piece molded fiber pallet.

Pallets are structures used for support and transport of articles of varying sizes and weights. Typically, pallets are made of wood. This has several disadvantages, however. Continuous use results in a substantial amount of wear and tear; the utility of a wooden pallet is rapidly diminished. Furthermore, repair and maintenance costs are prohibitively high, often being more than the replacement cost. Replacement is often necessary. It is therefore, an object of this invention to provide a pallet fabricated from a more durable, low cost, material.

It is also an object of this invention to provide a pallet of new design and that is strong, but light in weight.

Still another object is to provide a pallet that lends itself to easy manufacture.

These and other objects will become apparent from the description, when taken in conjunction with the following drawings in which.

Referring in greater detail to the drawings in which like numbers indicate like parts throughout the several views, the invention comprises a rectangular one-piece molded structure 1. A series of hollow legs 2, 3, 4, 5, 6, 7, 8, 9, 10 are formed in the planar deck 11 of structure 1. Hollow legs 5, 6, 7, are circular in shape; hollow legs 2, 3, 4, 8, 9, 10 are elliptical in shape, the major axes being parallel to the long sides of the rectangular structure 1. The hollow legs are spaced sufficiently far from each other and are located in parallel rows so that the forks of a lift truck can pass through the hollow legs and under the planar deck of the structure 1.

Figure 7:
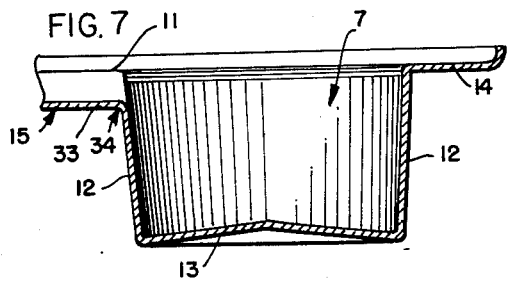
FIGURE 7 is an enlarged section taken on line 7—7 of FIGURE 4.
Figure 8:
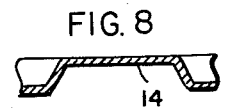
FIGURE 8 is an enlarged section taken on line 8—8 of FIGURE 4.

In FIGURE 7, the legs 7 consist of a wall 12 inclined slightly from the vertical so as to impart a tapered shape to the leg. Thus, the top portion of the leg is larger in diameter than the lower portion of the leg. The bottom 13 of leg 7 is raised slightly in its center to form a cone.

In addition to the hollow legs, there is a network of reinforcing ribs formed in the planar deck 11 of the structure 1. A first series of ribs 15 runs between adjacent hollow legs and parallel to the sides of the structure 1. For example, a rib 15 passes directly between legs 8 and 9. FIGURE 7 shows how a rib 15 is jointed to hollow leg 7. The bottom 33 of rib 15 meets wall 12 of hollow leg 7 at a point 34, which is below the level of the planar upper surface 11. Intersecting ribs 32 are molded adjacent the corners, preferably at right angles.

Ribs 16 of a second series are positioned close to and parallel to the sides of the structure 1.

A third series of ribs 17 and 18 runs diagonally between the hollow legs. As examples, rib 17 runs diagonally between legs 6 and 8 and rib 18 runs diagonally between hollow legs 7 and 9. Ribs of this third series intersect at points 19, 20, 21, 22. At the center of each of these points of intersection there is indentation 23, 24, 25, 26 forming a hollow pyramid extending upward in a reverse direction in the rib channels. These reverse indentations add greatly to the strength of the structure.

Figure 6:
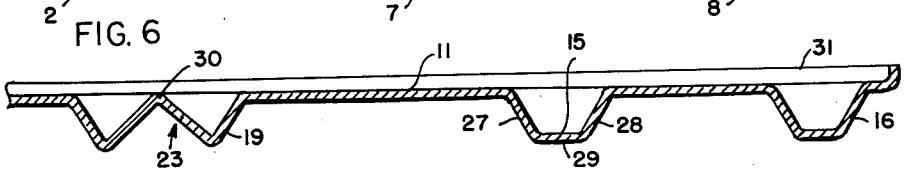
FIGURE 6 is an enlarged section taken on line 6—6 of FIGURE 4.

FIGURE 6 shows the rib network in enlarged cross-section. Ribs 15 and 16 are shown; the intersection 19 of ribs 17 and 18 is also shown. In the center of intersection 19 is reverse indentation 23. The reverse indentation 23 rises until its uppermost point 30 is level with the planar deck 11 of the structure 1. The walls of the rib network are inclined from the vertical to give the cross-section of a regular trapezoid. As an example, in FIGURE 6, rib 15 has two sides 27, 28 and a flat bottom 29 parallel to the planar deck 11.

Figure 1:
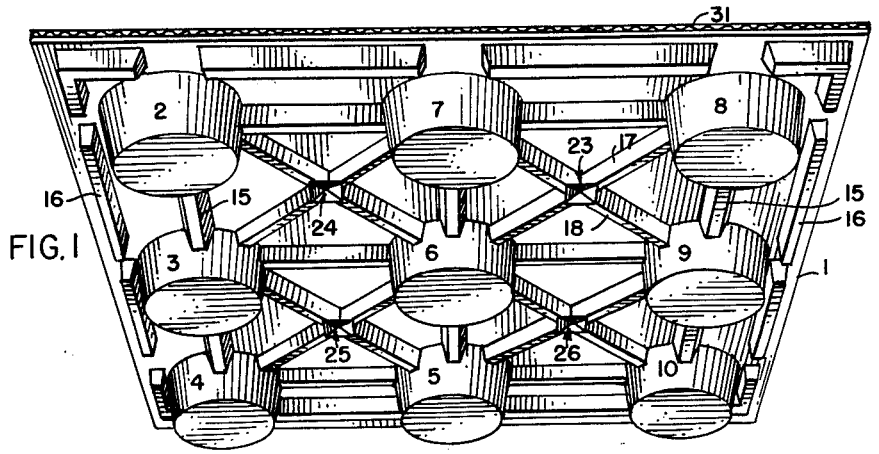
FIGURE 1 is a bottom perspective of a pallet representing a preferred embodiment of the invention.
Figure 2:
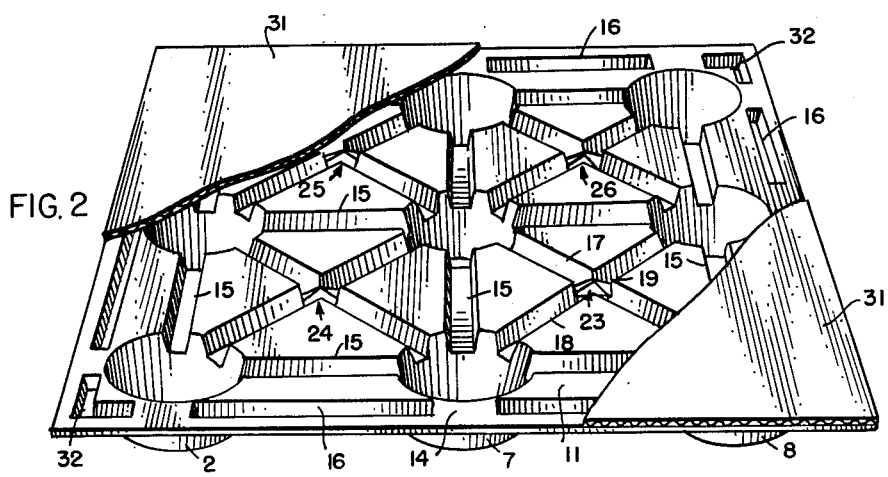
FIGURE 2 is a top perspective of the pallet of FIGURE 1 with the flat top sheet partially cut away.
Figure 3:
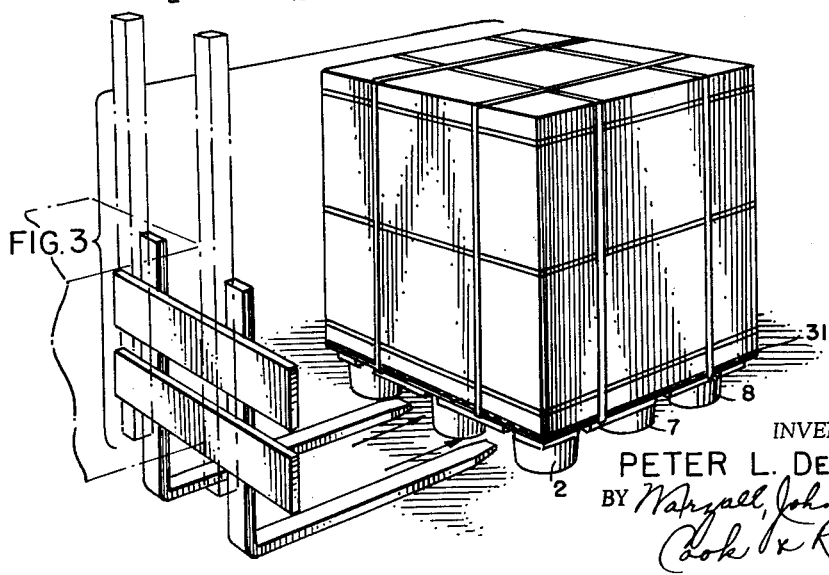
FIGURE 3 is a view of the loaded pallet being approached by the fork of a lift truck.
Figure 4:
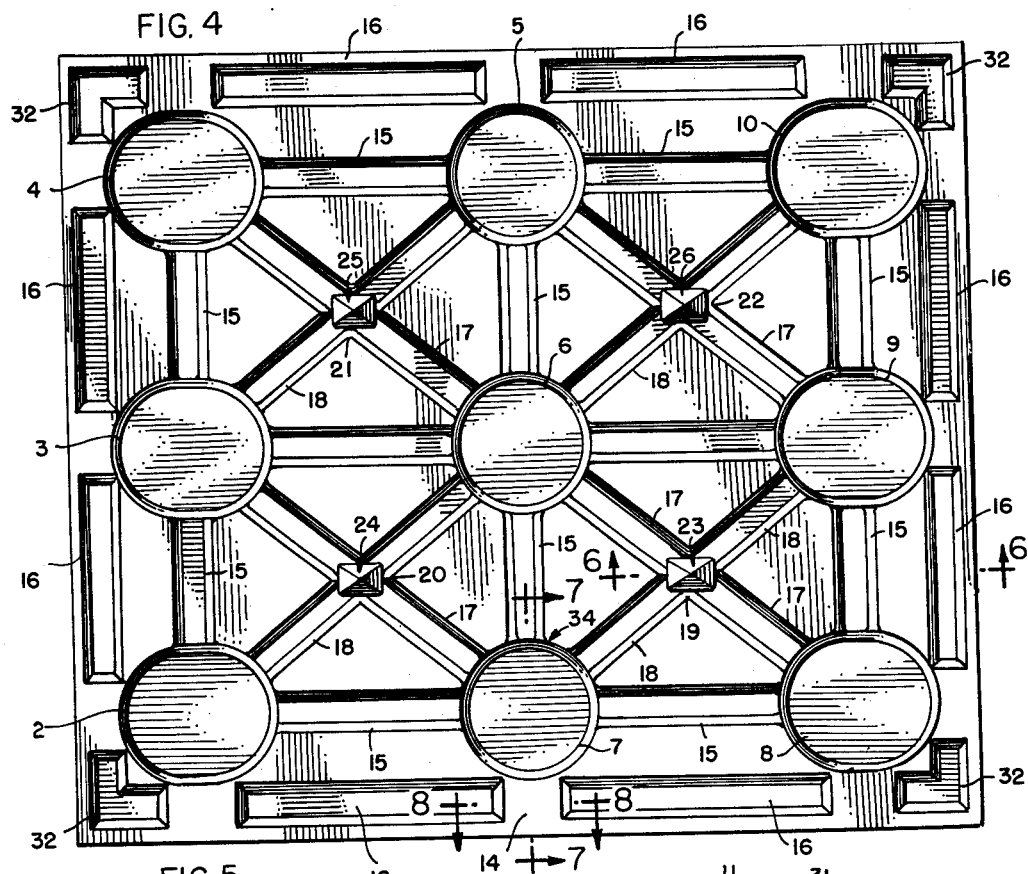
FIGURE 4 is a top view of the one-piece molded structure without the flat top sheet.
Figure 5:
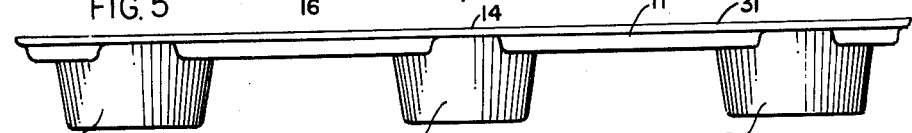
FIGURE 5 is a front view of the one-piece molded structure of FIGURE 4.

The one-piece molded structure may be used alone, or a flat top sheet 31 may be attached to the planar deck 11. This arrangement is clearly illustrated in FIGURE 2 which shows the molded structure 1 and flat top sheet 31, portions of which are cut away. The flat top sheet 31 is constructed of double-faced corrugated board which is glued in place.

It is preferred that the pallet be molded out of resin impregnated wood-cellulose fiber. However, any material suitable for molding can be used. The molded structure is preferably made by accreting fibers from an aqeuous slurry of fibers onto a porous screen or mold having the described shape. The molded preform is then removed from the screen or mold and dried. The drying can be effected between heated male and female metal dies contoured to the shape of the molded piece and at least one of which contains perforations connected to a source of vacuum whereby heated air is drawn through the molded piece and moisture is removed. The molded piece can also be dried by supporting it on a porous male mold or screen and drawing air through the piece by applying suction to the pores of the mold or screen. Mixtures of cut bundles of glass filaments and cellulose with resin additions can be accreted from aqueous slurries to produce stronger molded structures. Such structures can contain, for example, 5% to 95% cut glass rovings, 95% to 5% cellulose fibers, based on the total weight of fibers and 5% to 25% resin (e.g. polyester resin) based on the weight of glass fibers.

There are many modifications that can be made to obtain specific objectives. Extra durability of the flat top sheet can be obtained by substituting hard board or thin plywood sheets for the corrugated board. Or a second piece of molded fiber may be used for the flat top sheet. This latter arrangement provides a pallet of particularly high strength.

This invention provides a durable, strong pallet, one which is capable of supporting heavy loads, yet one which is quite light. The pallet will withstand prolonged exposure to moisture and shows little wear and tear when roughly handled. When molded in the shape hereinbefore described, the pallet thereby formed is extremely strong. If it is desired to support and transport particularly heavy loads, the insertion of water-proof mailing tube sections into the hollow legs materially increases the amount of weight that can safely be supported, but adds little to the weight of the pallet.

A thin vertical rim may be formed around the edge of the molded structure or the flat top sheet. The presence of such a rim materially aids in positioning loads.

An important feature of the invention is that the one-piece molded structures are nestable one within the other and hence occupy a minimum amount of space during stroage or shipment. It will be observed that the hollow legs are tapered, that is, they tend to converge from top to bottom. The various reinforcing ribs are also tapered. This makes nesting possible in the one-piece molded structure before the top sheet 31 is applied. Even after the application of the top sheet 31, a substantial amount of nesting can be obtained by cutting holes in the top sheet 31 above the hollow legs corresponding in size to the openings in the upper parts of the hollow legs 2, 3, 4, 5, 6, 7, 8, 9 and 10.

The invention is hereby claimed as follows:

1. A pallet comprising a unitary structure molded from a resin-impregnated, fiber composition and embodying a deck providing load-supporting surface, a plurality of spaced, hollow, legs depending from the opposite surface of said deck, a network of ribs projecting from said opposite surface and forming a network of corresponding channels in said load-supporting surface, said ribs extending between pairs of said hollow legs, at least some of said ribs crossing each other, and reverse indentations in the walls of said ribs at the intersections of the crossing ribs forming projections in said channels at said intersections and adding greatly to the strength of said pallet.

2. A pallet as claimed in claim 1 wherein said deck is rectangular, and said deck has adjacent to and parallel to the respective peripheral edges thereof a plurality of elongated, longitudinally-aligned, longitudinally spaced ribs projecting from said opposite surface and forming corresponding channels in said load-supporting surface.

3. A pallet comprising a unitary structure embodying a deck providing load-supporting surface, a plurality of spaced, hollow, legs depending from the opposite surface of said deck, a network of ribs projecting from said opposite surface and forming a network of corresponding channels in said load-supporting surface, said ribs extending between pairs of said hollow legs, at least some of said ribs crossing each other, and said unitary structure of said deck, said ribs and said hollow legs being molded as said unitary structure from a resin-impregnated wood-cellulose fiber composition.

4. A pallet as claimed in claim 3 wherein said composition comprises 5–95% cut glass rovings and 95–5% wood-cellulose fibers, said percentages based on the total weight of fibers of said composition, plus 5–25% of polyester resin, based on the weight of said glass fibers.

5. A pallet comprising a unitary structure embodying a deck providing a load-supporting surface, a plurality of spaced, hollow legs depending from the opposite surface of said deck, said legs having an end wall at the bottom thereof, which end walls are inclined in a direction toward said deck from the edges toward the center thereof and form a hollow cone, a network of ribs projecting from said opposite surface and forming a network of corresponding channels in said load-supporting surface, said ribs extending between pairs of said hollow legs, at least some of said ribs crossing each other, and reverse indentations in the walls of said ribs at the intersections of the crossing ribs forming projection in said channels at said intersections and adding greatly to the strength of said pallet.

6. A pallet comprising a unitary structure embodying a rectangular deck providing rectangular, load-supporting surface, a plurality of spaced, hollow legs depending from the opposite surface of said deck, a network of ribs projecting from said opposite surface and forming a network of corresponding channels in said load-supporting surface, said ribs extending between pairs of said hollow legs, at least some of said ribs crossing each other, reverse indentations in the walls of said ribs at the intersections of the crossing ribs forming projections in said channels at said intersections and adding greatly to the strength of said pallet, said deck having adjacent to and parallel to the respective peripheral edges thereof a plurality of elongated, longitudinally-aligned, longitudinally spaced ribs projecting from said opposite surface and forming corresponding channels in said load-supporting surface, and the respective corners of said rectangular deck having formed therein L-shaped ribs projecting from said opposite surface and forming corresponding channels in said load-supporting surface and spaced from said longitudinally-spaced ribs.

7. A pallet as claimed in claim 3 wherein said load-supporting surface includes flat, top sheet secured on said pallet over the hollow spaces formed by said ribs and said legs.

8. A pallet as claimed in claim 1 wherein said load-supporting surface includes flat, top sheet secured on said pallet over the hollow spaces formed by said ribs and said legs.

References Cited in the file of this patent

UNITED STATES PATENTS

| | | |
|---|---|---|
| 2,463,214 | Stoner | Mar. 1, 1949 |
| 2,568,582 | Farrar | Sept. 18, 1951 |
| 2,615,661 | Cushman | Oct. 28, 1952 |
| 2,706,099 | Whalley | Apr. 12, 1955 |
| 2,870,981 | Dellinger et al. | Jan. 27, 1959 |
| 2,903,218 | Altenburg | Sept. 8, 1959 |
| 2,973,931 | Brown | Mar. 7, 1961 |
| 2,991,965 | Drieborg | July 11, 1961 |

FOREIGN PATENTS

| | | |
|---|---|---|
| 807,571 | Great Britain | July 13, 1954 |